United States Patent

Pollak

[11] 4,114,473
[45] Sep. 19, 1978

[54] GUARD FOR BELT PULLEY

[76] Inventor: Henry M. Pollak, 823 Brookside Rd., Pottstown, Pa. 19464

[21] Appl. No.: 746,366

[22] Filed: Dec. 1, 1976

[51] Int. Cl.² ............................................. F16P 1/00
[52] U.S. Cl. ...................................... 74/611; 254/197
[58] Field of Search ................... 254/197, 190 R, 138; 74/608, 609, 611; 224/30 R

[56] References Cited

U.S. PATENT DOCUMENTS

| 592,288 | 10/1897 | Holmes | 74/611 |
| 1,271,612 | 7/1918 | Pieper et al. | 74/611 |
| 2,295,582 | 9/1942 | Ingwer | 74/611 |
| 2,607,241 | 8/1952 | Peterson | 74/611 |
| 2,967,432 | 1/1961 | Shane et al. | 74/609 |
| 2,971,399 | 2/1961 | Roberts | 74/609 |
| 3,811,340 | 5/1974 | Morse | 74/611 |

Primary Examiner—Trygve M. Blix
Assistant Examiner—Kenneth Noland
Attorney, Agent, or Firm—Seidel, Gonda & Goldhammer

[57] ABSTRACT

A guard is provided for installation within an endless belt extending around a pair of pulleys for preventing danger associated with the nip between the belt and pulleys without interferring with freedom of access to the belt.

4 Claims, 5 Drawing Figures

GUARD FOR BELT PULLEY

BACKGROUND

A wide variety of machines utilize a pair of pulleys having an endless belt extending therebetween including automobiles, drill presses, saws, etc. As a general rule, the pulleys and belt are provided with a housing which acts as a guard to prevent inadvertent accidents in connection with the danger associated with the nip between the belt and the pulley. A housing which encloses the pulleys and belt adequately performs its intended function. However, such housing is considered to a nuisance by the operators since it interferes with freedom of access to the belt. Access to the belt is often desired when changing the location of the belt with respect to the pulley grooves such as when changing speeds. Also, an enclosed housing adds to the cost of the equipment.

The guard of the present invention prevents the danger associated with the nip between the belt and the pulleys while at the same time is less expensive, and provides for complete access to the pulley at all times.

SUMMARY OF THE INVENTION

The present invention is directed to a pulley guard adapted to be mounted within an endless belt adjacent a pulley. The guard includes a top wall adapted to overlie only a peripheral portion of a pulley. A side wall is connected to the top wall and extends downwardly therefrom.

A projection is provided on said side wall below said top wall. The projection is adapted to enter a pulley groove and terminates in an arcuate end face.

A mounting means is provided. The mounting means is connected to said side wall below the elevation of said projection for mounting said walls in a position so that said projection may enter a pulley groove and occupy substantially all of the pulley groove which is unoccupied by the belt.

It is an object of the present invention to provide a guard for a pulley belt which prevents the danger associated with the nip between the belt and a pulley while providing complete access to the belt.

It is another object of the present invention to provide a pulley guard which is adapted to be mounted within an endless belt adjacent the periphery of a pulley having a plurality of grooves each adapted to receive a portion of an endless belt.

It is another ojbect of the present invention to provide a pulley guard which is simple, adapted for installation on existing pulleys in the field, while being reliable and inexpensive.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
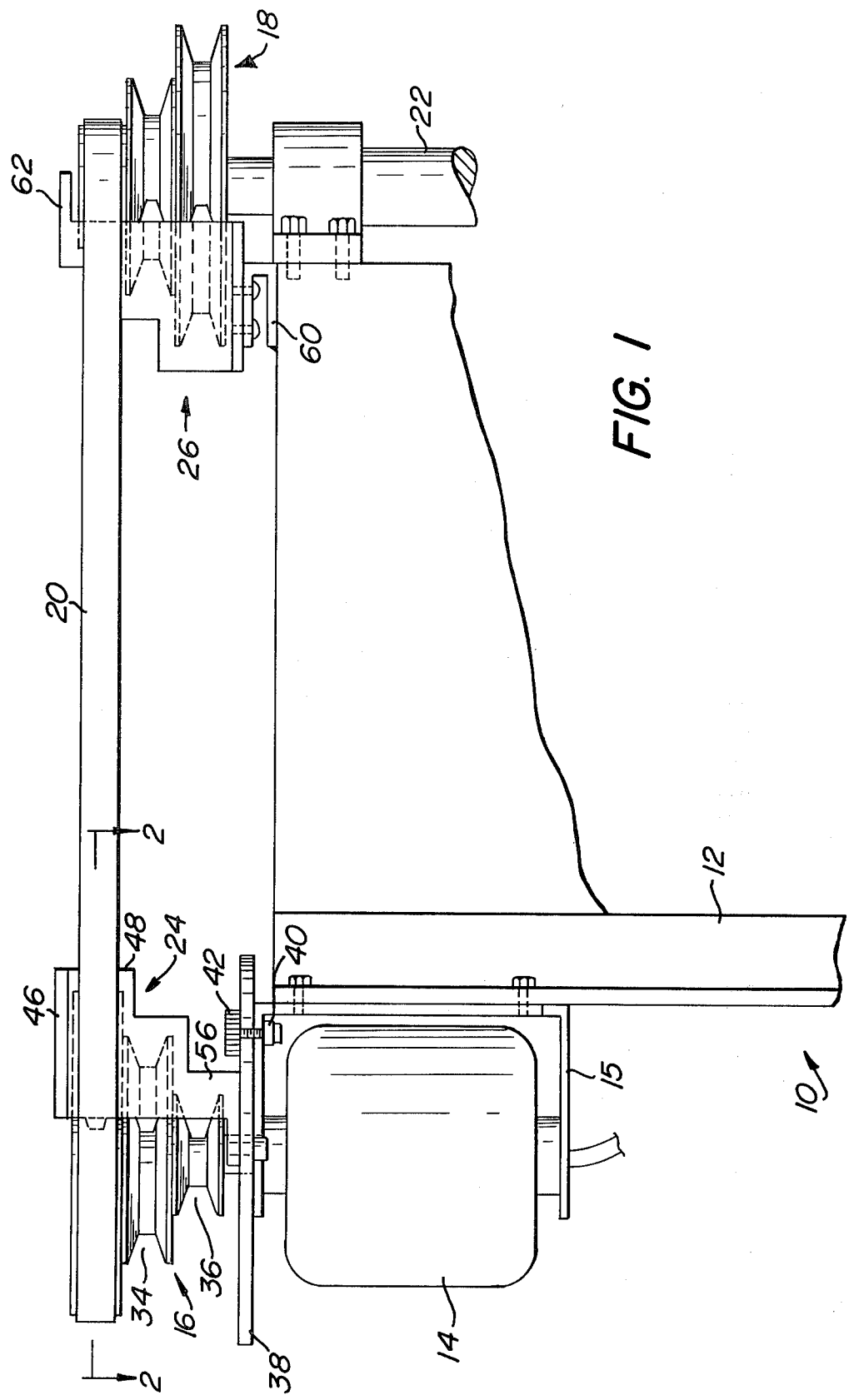
FIG. 1 is a elevation view of a machine incorporating the guard of the present invention.

Referring to the drawings in detail, wherein like numerals indicate like elements, there is shown in FIG. 1 a typical machine 10 which is adapted to receive and utilize the guard of the present invention. The machine 10 includes a frame 12 on which is supported a motor by way of a mounting bracket 15. Motor 14 is adapted to drive pulley 16. Pulley 16 is coupled to pulley 18 by way of an endless belt 20. Pulley 18 is connected to a shaft 22 and drives the same. Shaft 22 may be provided with any type of desired tool such as a drill, reamer, saw blade, or may operate a pump or some equivalent device.

Within the endless loop of belt 20, there is provided guards 24 and 26 which are mirror images of one another when the pulleys 16 and 18 are multigrooved pulleys installed so as to be mirror images of one another and adapted to facilitate change of speeds. In their simplest form, the pulleys 16 and 18 may be single groove pulleys. The guards 24 and 26 are otherwise identical. Hence, only guard 24 will be described in detail.

Motor 14 is provided with an output shaft 28. See FIG. 3. Pulley 16 is keyed to shaft 28 and connected thereto by way of set screw 30. For purposes of illustration, pulley 16 has a plurality of grooves of different diameters, namely grooves 32, 34 and 36.

Figure 3:
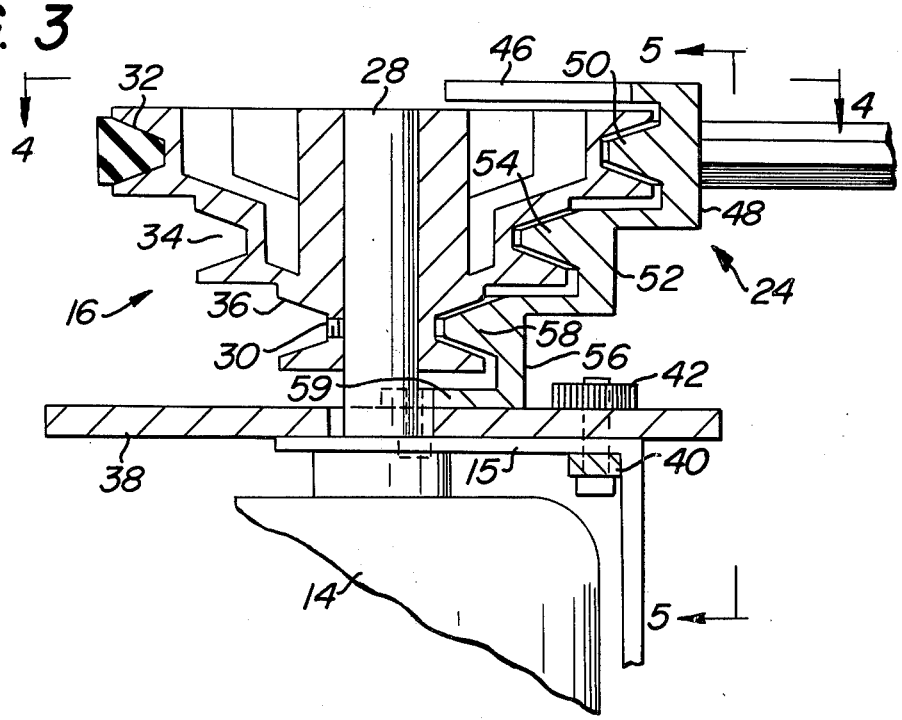
FIG. 3 is a sectional view taken along the line 3—3 in FIG. 2.

Guard 24 includes an annular mounting plate 38 having a centrally disposed hole through the shaft 28 extends. A bar member 40 is disposed below the horizontally disposed portion of bracket 15 as shown in FIG. 3. Threaded fasteners having enlarged heads 42 and 44 are threadedly coupled to the bar 40 and positioned in a manner so that the heads 42, 44 overlie the mounting plate 38. In this manner, the guard 24 is removably attached to the bracket 15. In addition, the guard 24 may be rotated through a limited arc about the axis of shaft 28.

Figure 4:
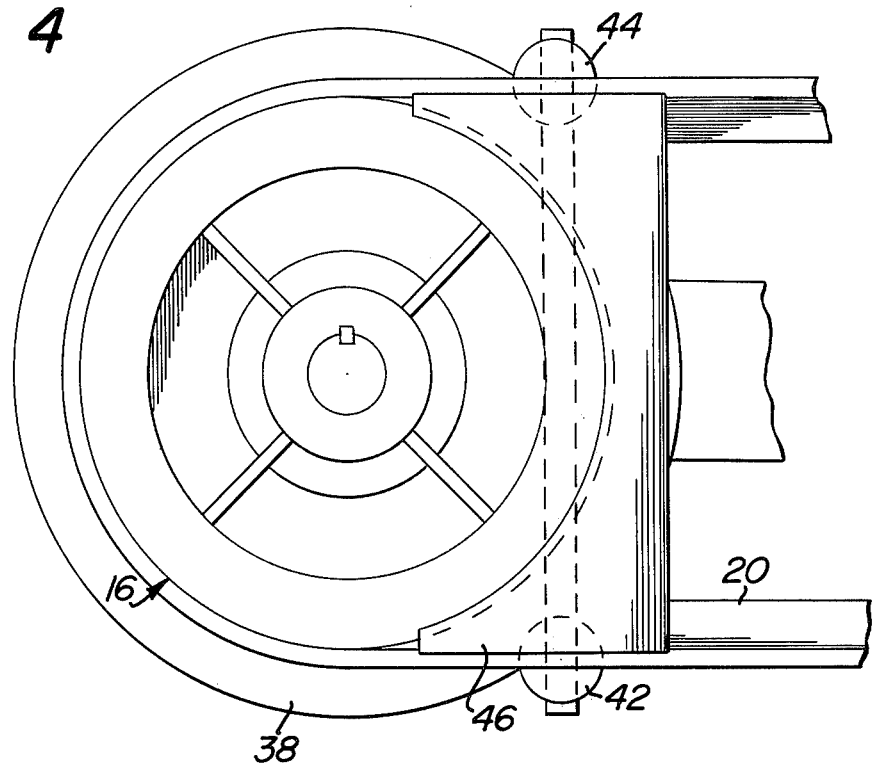
FIG. 4 is a top plan view as seen along line 4—4 in FIG. 3.

Guard 24 includes a top wall 46 which overlies only a peripheral portion of the upper surface of the pulley 16 for an actuate extent less than 180°. See FIG. 4. The inner periphery of the wall 46 terminates in an arcuate surface having the axis of shaft 28 as its center of curvature. As shown more clearly in FIG. 4, the top wall 46 results in end portions which extend to or immediately adjacent to the nip between belt 20 and the groove 32 on the pulley 16.

Figure 5:
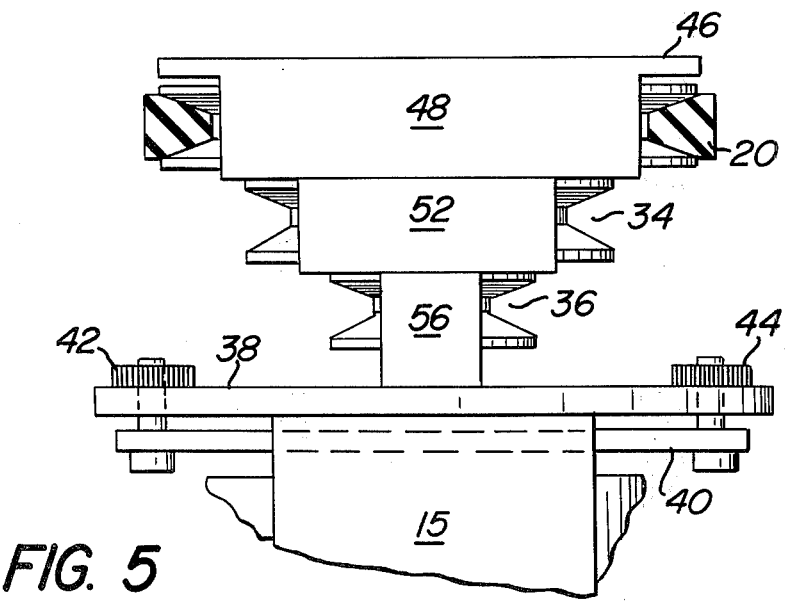
FIG. 5 is a sectional view taken along the line 5—5 in FIG. 3.

A side wall 48 is connected to the top wall 46 and extends downwardly therefrom. Side wall 48 is disposed in its entirety between the runs of the belt 20. See FIG. 5. Thus, the transverse dimensions of side wall 48 are less than the transverse dimensions of top wall 46.

Figure 2:
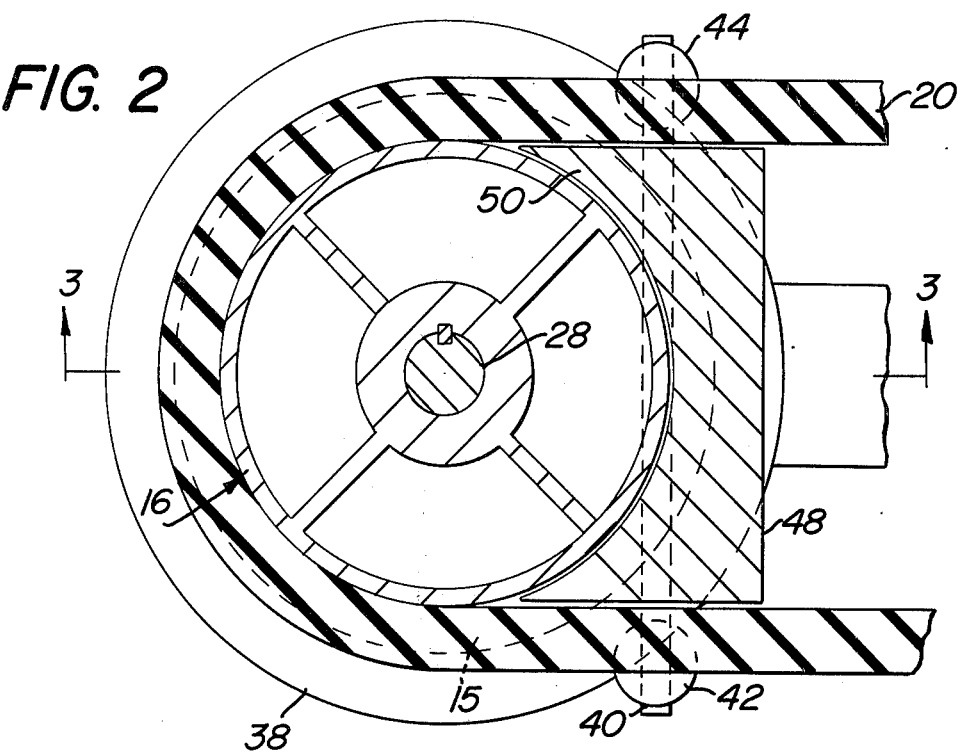
FIG. 2 is a sectional view taken along the line 2—2 in FIG. 1.

A projection 50 is integral in one piece with the side wall 48. Projection 50 has surfaces which mate with the surfaces of groove 50. The arcuate extent of projection 50 is less than 180° and occupies substantially all space of groove 32 which is unoccupied by the belt 20. See FIGS. 2 and 3. The free end of projection 50 terminates in an arcuate end face having its center of curvature at the longitudinal axis of shaft 28.

Side wall 48 is integrally connected in one piece to a second side wall 52. Side wall 52 is radially closer to the axis of shaft 28 than side wall 48. See FIG. 3. Side wall 52 is provided with a projection 54. Projection 54 terminates at its free end in an arcuate end face and occupies substantially all of the space of groove 34 which is unoccupied by the drive belt 20 when the drive belt 20 is disposed within groove 34. As shown more clearly in FIG. 5, the transverse dimension of side wall 52 and its associated projection 54 is less than that of side wall 48 and its projection 50.

Side wall 52 is integrally connected to a third side wall 56 disposed radially inwardly from side wall 52. Side wall 56 has a projection 58 which occupies all of the space of groove 36 left unoccupied by the drive belt when the latter is disposed within groove 36. The free end of projection 58 terminates in an arcuate surface. As shown more clearly in FIG. 5, the side wall 56 and its projection 58 have transverse dimensions less than that of side wall 52 and its projection 54. Side wall 56 has a flange 59 overlying the mounting plate 38 and fixedly secured thereto in any convenient manner such as by riveting so as to fixedly secure said side walls 48, 52, 56 to the mounting plate 38.

Projection 54 at its free end has an arcuate end face which is shorter in arcuate length than that of projection 50 but is closer to the longitudinal axis of the pulley 16 as compared with projection 50. Likewise, the arcuate length of the end face of projection 54 is shorter in length but closer to the axis of pulley 16 as compared with the projection 54.

The guard 26 has the wall corresponding to top wall 46 fixedly secured to a mounting bracket 60 with the wall 62 overlying the pulley 18. Wall 62 corresponds to the flange 59 which projects from wall 56 and is secured to the mounting plate 38. Thus, the respective guards 24 and 26 are identical except for the flange or wall used as the top wall for overlying the portion of the periphery of the pulleys. Except for the mounting plate or bracket, elements 38 and 60, the guards are preferably made of a non-corrosive metal such as aluminum die cast in one piece.

As will be apparent from FIG. 1, the pulleys 16 and 18 and the belt 20 are at all times readily accessible. Since the guards are disposed between the runs of the belt 20, the belt 20 is at all times readily accessible for speed changes. Since the projections 50, 54 and 58 on the guards occupy all or substantially all of the space of their respective grooves which is unoccupied by the belt, and top wall 46 overlies the juxtaposed peripheral portion of the pulley, there is no danger associated with the nip between the pulley and the belt 20. The mounting plate 38 and elements 40-44 facilitate attachment of the guard 24 to a motor driven pulley existing in the field.

The present invention may be embodied in other specific forms without departing from the spirit or essential attributes thereof and, accordingly, reference should be made to the appended claims, rather than to the foregoing specification as indicating the scope of the invention.

I claim:

1. A pulley guard mounted within an endless belt adjacent a pulley which has three grooves each of a different diameter, the guard including a top wall for overlying a portion of the pulley side face between the nips of said belt and said pulley, a side wall connected to said top wall and extending generally at right angles therefrom, said guard having three projections on said side wall with each projection terminating in an arcuate end face juxtaposed to the inner diameter of one of said pulley grooves, each arcuate end face on said projections having a center of curvature corresponding to the axis of rotation of said pulley, mounting means connected to one of said walls for mounting said walls in a position so that each of said projections enters one of said pulley grooves and one projection occupies substantially all its pulley groove which is unoccupied by the belt, said mounting means including a mounting plate having a hole for accomodating the drive shaft of a motor, said drive shaft being connected to said pulley, and an adjustable clamp associated with said mounting plate for securing the mounting plate to a support which is stationary with respect to said pulley.

2. A pulley guard in accordance with claim 1 wherein said stationary support is also the support for said motor.

3. A pulley guard for a rotatable pulley having a groove receiving an endless belt, the belt cooperating with the pulley groove to define a pair of nips, the guard including first and second walls which are generally perpendicular to one another, said first walls overlying said nips and being generally perpendicular to the axis of rotation of the pulley, a projection connected to said second wall, said projection extending into said groove and occupying substantially the entire distance between the nips, said projection terminating in an arcuate end face, the center of curvature of said arcuate end face corresponding to the axis of rotation of the pulley, a clamp connected to one of said walls for arcuately adjusting said walls and projection as a unit about the axis of rotation of said pulley, said pulley having a plurality of grooves each of a different diameter, said second wall having a plurality of said projections, each of said projections extending into one of said grooves and having an arcuate end face corresponding to the axis of rotation of the pulley, the length of the arcuate end faces on said projections being different from one another so that each arcuate end face may extend between the nips on its associated pulley groove.

4. A pulley guard for a rotatable pulley having a groove receiving an endless belt, the belt cooperating with the pulley groove to define a pair of nips, the guard including first and second walls which are generally perpendicular to one another, said first wall overlying said nips and being generally perpendicular to the axis of rotation of the pulley, said second wall being disposed between the runs of said belt, a projection connected to said second wall, said projection extending into said groove and occupying substantially the entire distance between the nips, said projection terminating in an arcuate end face, the center of curvature of said arcuate end face corresponding to the axis of rotation of the pulley, a clamp connected to one of said walls and a stationary support remote from said groove for arcuately adjusting said walls and projection as a unit about the axis of rotation of said pulley.

* * * * *